(12) United States Patent
Han et al.

(10) Patent No.: US 11,558,563 B2
(45) Date of Patent: Jan. 17, 2023

(54) SYSTEMS AND METHODS FOR IMMERSIVE SCENES

(71) Applicant: Zoom Video Communications, Inc., San Jose, CA (US)

(72) Inventors: Lin Han, Los Altos, CA (US); Nitasha Walia, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/233,335

(22) Filed: Apr. 16, 2021

(65) Prior Publication Data
US 2022/0353438 A1 Nov. 3, 2022

(51) Int. Cl.
*H04N 7/15* (2006.01)
*H04N 5/272* (2006.01)
*G06T 7/20* (2017.01)
*G06T 7/194* (2017.01)
*G06T 7/12* (2017.01)

(52) U.S. Cl.
CPC .............. *H04N 5/272* (2013.01); *G06T 7/12* (2017.01); *G06T 7/194* (2017.01); *G06T 7/20* (2013.01); *H04N 7/15* (2013.01); *G06T 2207/10016* (2013.01); *G06T 2207/30196* (2013.01)

(58) Field of Classification Search
CPC . H04N 5/272; H04N 7/15; G06T 7/20; G06T 7/12; G06T 7/194
USPC ............................................ 348/14.01–14.16
See application file for complete search history.

(56) References Cited

U.S. PATENT DOCUMENTS

| | | | | |
|---|---|---|---|---|
| 7,528,860 | B2 * | 5/2009 | Harville | H04N 7/15 348/14.08 |
| 8,432,431 | B2 * | 4/2013 | Gorzynski | H04N 7/15 348/14.07 |
| 11,082,661 | B1 * | 8/2021 | Pollefeys | H04N 7/152 |
| 2009/0033737 | A1 | 2/2009 | Goose et al. | |
| 2013/0093835 | A1 | 4/2013 | Paithankar | |
| 2013/0342629 | A1 * | 12/2013 | North | H04N 21/8146 348/14.01 |
| 2014/0058894 | A1 * | 2/2014 | Hohenacker | G06Q 30/06 705/26.41 |
| 2018/0367835 | A1 * | 12/2018 | Hamidi-Rad | H04N 21/44222 |
| 2019/0362312 | A1 | 11/2019 | Platt et al. | |
| 2020/0045261 | A1 * | 2/2020 | Lim | H04N 5/272 |

(Continued)

OTHER PUBLICATIONS

International Application, Partial International Search Report, PCT/US2022/024423, dated Jul. 26, 2022, 4 pages.

*Primary Examiner* — Melur Ramakrishnaiah
(74) *Attorney, Agent, or Firm* — Kilpatrick Townsend & Stockton LLP

(57) ABSTRACT

One example system for displaying immersive scenes includes a processor and at least one memory device. The memory device includes instructions that are executable by the processor to cause the processor to receive a collection of metadata associated with an immersive scene, identify each of a plurality of properties of the immersive scene based on the collection of metadata, receive a dynamic immersive background, receive a plurality of video streams associated with a video conference, and display each of the plurality of video streams in the immersive scene based at least in part of the plurality of properties of the immersive scene and on the dynamic immersive background.

21 Claims, 7 Drawing Sheets

(56) References Cited

U.S. PATENT DOCUMENTS

2020/0314355 A1* 10/2020 Punja .................... H04N 5/272
2020/0358983 A1   11/2020 Astarabadi

* cited by examiner

SYSTEMS AND METHODS FOR IMMERSIVE SCENES

FIELD

The present application generally relates to video conferences and more particularly relates to systems and methods for immersive scenes.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or video conference. The advent of user-friendly videoconferencing software has enabled teams to work collaboratively despite being dispersed around the country or the world. It has also enabled families and friends to engage with each other in more meaningful ways, despite being physically distant from each other.

SUMMARY

One example system for displaying immersive scenes includes a processor and at least one memory device. The memory device includes instructions that are executable by the processor to cause the processor to receive a collection of metadata associated with an immersive scene, identify each of a plurality of properties of the immersive scene based on the collection of metadata, receive a dynamic immersive background, receive a plurality of video streams associated with a video conference, and display each of the plurality of video streams in the immersive scene based at least in part of the plurality of properties of the immersive scene and on the dynamic immersive background.

One example method includes receiving a collection of metadata associated with an immersive scene, identifying each of a plurality of properties of the immersive scene based on the collection of metadata, receiving a dynamic immersive background, receiving a plurality of video streams associated with a video conference, and displaying each of the plurality of video streams in the immersive scene based at least in part of the plurality of properties of the immersive scene and on the dynamic immersive background.

One example non-transitory computer-readable medium includes code that is executable by a processor for causing the processor to receive a collection of metadata associated with an immersive scene, identify each of a plurality of properties of the immersive scene based on the collection of metadata, receive a dynamic immersive background, receive a plurality of video streams associated with a video conference, and display each of the plurality of video streams in the immersive scene based at least in part of the plurality of properties of the immersive scene and on the dynamic immersive background.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
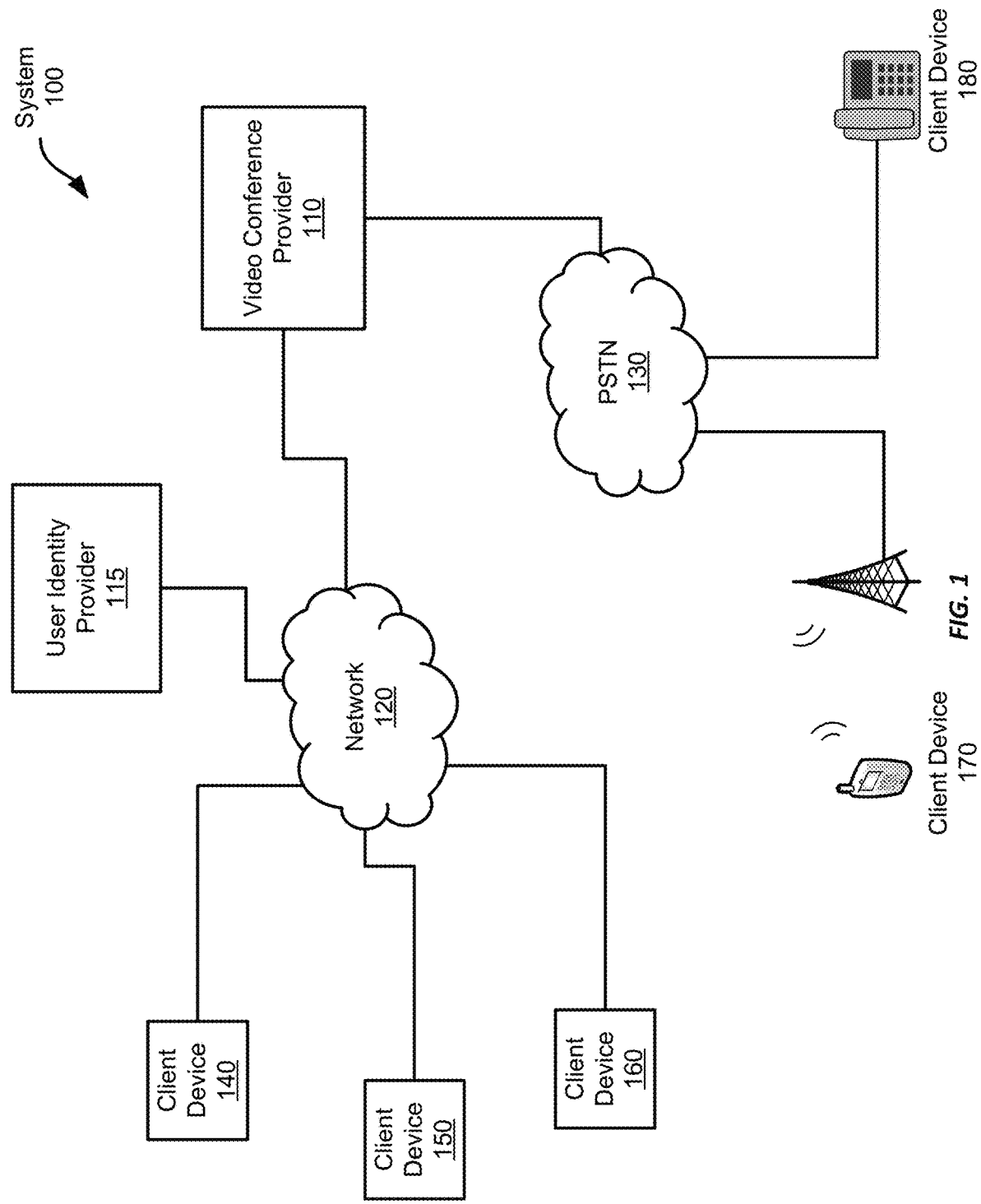
FIGS. 1 and 2 illustrate example systems to enable immersive scenes.

Examples are described herein in the context of systems and methods for immersive scenes. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In an example video conference, rather than each video stream being displayed with its own background in a separate window on a participant's screen, the video streams of each participant are displayed together within a dynamic immersive background. In various examples, the video conference may be a class, a conference, or a courtroom. And the dynamic immersive background is associated with the type of video conference. For instance, in the example of a class, the dynamic immersive background resembles a classroom. The background is dynamic in that it allows the video stream to be displayed dynamically rather than as, for example, a static avatar of a video conference provider.

Each participant in the virtual class receives the dynamic immersive background. For example, the participants may receive an image file of the immersive background. In other examples, a participant, such as the host, can create a dynamic immersive background and share it with other participants in the video conference.

Each participant also receives metadata that describes how video streams are to be displayed in the dynamic immersive background. For example, a participant may receive an XML file that includes properties indicating the locations within the dynamic immersive background at which video streams may be displayed. In the class example, each location may be associated with a virtual desk inside a virtual classroom. Other properties might define, for example, a name plate displayed on the virtual desk within the virtual classroom in which the name of the participant can be displayed.

Each participant in the video conference also receives the video streams associated with other participants in the video conference. In order to allow each participant to be displayed at a desk in the virtual classroom, the example system may create an outline around the user displayed in a video stream. Then, using the outline, the example system removes the background from the video stream. In other words, the resulting display is only of the user within the outline. The area of the video stream outside the outline is then made removable, e.g., it may be made transparent, so that the area of the video stream outside the area defined by the outline does not obscure the dynamic immersive background.

Various example systems may provide video effects similar to what a teacher of the classroom might see while standing at the front of the class. For instance, in a virtual classroom with desks, the video streams displayed at desks at the back of the virtual classroom may be somewhat smaller than video streams displayed at the front. In this way, the virtual classroom appears more like a physical classroom. In some examples, the user can pan across the classroom or zoom in and out on particular streams in the classroom. For instance, if a class includes one hundred students, an example system may only display twenty-five at a time. However, the user can pan right or left, and in response the example system updates the dynamic immersive scene to display different users as if the user were turning their head left and right in the classroom.

Such example systems provide numerous advantages. For example, video conferences utilizing immersive scenes are more immersive, engaging, and collaborative than existing video conferences. Such example system can help to increase engagement in a video conference and therefore help to reduce video conferencing fatigue, i.e., loss of attention during a video conference. By reducing video conference fatigue, such systems can help to boost productivity associated with video conferences.

This illustrative example is given to introduce the reader to the general subject matter discussed herein and the disclosure is not limited to this example. The following sections describe various additional non-limiting examples and examples of systems and methods for immersive scenes.

Referring now to FIG. 1, FIG. 1 shows an example system 100 that provides video conferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Video conference provider 110 allows clients to create video conferences, and invite others to participate in those video conferences as well as perform other related functionality, such as recording the video conferences, generating transcripts from video conference audio, manage user functionality in the video conferences, enable text messaging during the video conferences, etc.

To create a video conference with the video conference provider 110, a video conference host may contact the video conference provider 110 using a client device 140-180 and select an option to create a new video conference. Such an option may be provided in a webpage accessed by a client device 140-160 or client application executed by a client device 140-160. For telephony devices, the host may be presented with an audio menu that they may navigate by pressing numeric buttons on their telephony device. To create the video conference, the video conference provider 110 may prompt the host for certain information, such as a date, time, and duration for the video conference, a number of participants, whether the video conference is confidential or open to the public, etc. After receiving the various video conference settings, the video conference provider may create a record for the video conference and generate a video conference identifier and, in some examples, a corresponding video conference password or passcode (or other authentication information), all of which video conference information is provided to the video conference host.

After receiving the video conference information, the host may distribute the video conference information to one or more users to invite them to the video conference. To begin the video conference at the scheduled time (or immediately, if the video conference was set for an immediate start), the host provides the video conference identifier and, if applicable, corresponding authentication information (e.g., a password or passcode). The video conference system then initiates the video conference and may admit users to the video conference. Depending on the options set for the video conference, the users may be admitted immediately upon providing the appropriate video conference identifier (and authentication information, as appropriate), even if the host has not yet arrived, or the users may be presented with information indicating the that video conference has not yet started or the host may be required to specifically admit one or more of the users.

During the video conference, the participants may employ their client devices 140-180 to capture audio or video information and stream that information to the video conference provider 110. They also receive audio or video information from the video conference provider 210, which is displayed by the respective client device 140 to enable the various users to participate in the video conference.

At the end of the video conference, the host may select an option to terminate the video conference, or it may terminate automatically at a scheduled end time or after a predetermined duration. When the video conference terminates, the various participants are disconnected from the video conference and they will no longer receive audio or video streams for the video conference (and will stop transmitting audio or video streams). The video conference provider 110 may also invalidate the video conference information, such as the video conference identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new video conferences or join existing video conferences. To do so, the client devices 140-160 may provide user identification information, video conference identifiers, video conference passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference, e.g., a video conference identifier ("ID"), a passcode or password, etc., to allow the telephony device to join the video conference and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a video conference after providing video conference information, e.g., a video conference identifier and passcode, but they may be identified only as an anonymous participant in the video conference. This may restrict their ability to interact with the video conferences in some examples, such as by limiting their ability to speak in the video conference, hear or view certain content shared during the video conference, or access other video conference functionality, such as joining breakout rooms or engaging in text chat with other participants in the video conference.

It should be appreciated that users may choose to participate in video conferences anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain video conferences or other services, or may be entirely prevented from accessing the video conference provider.

Referring again to video conference provider 110, in some examples, it may allow client devices 140-160 to encrypt their respective video and audio streams to help improve privacy in their video conferences. Encryption may be provided between the client devices 140-160 and the video conference provider 110 or it may be provided in an end-to-end configuration where multimedia streams transmitted by the client devices 140-160 are not decrypted until they are received by another client device 140-160 participating in the video conference. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the video conference for the participants or generating transcripts of the video conference for the participants. End-to-end encryption may be used to keep the video conference entirely private to the participants without any worry about a video conference provider 110 having access to the substance of the video conference. Any suitable encryption methodology may be employed, including key-pair encryption of the streams. For example, to provide end-to-end encryption, the video conference host's client device may obtain public keys for each of the other client devices participating in the video conference and securely exchange a set of keys to encrypt and decrypt multimedia content transmitted during the video conference. Thus the client devices 140-160 may securely communicate with each other during the video conference. Further, in some examples, certain types of encryption may be limited by the types of devices participating in the video conference. For example, telephony devices may lack the ability to encrypt and decrypt multimedia streams. Thus, while encrypting the multimedia streams may be desirable in many instances, it is not required as it may prevent some users from participating in a video conference.

By using the example system shown in FIG. 1, users can create and participate in video conferences using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Figure 2:
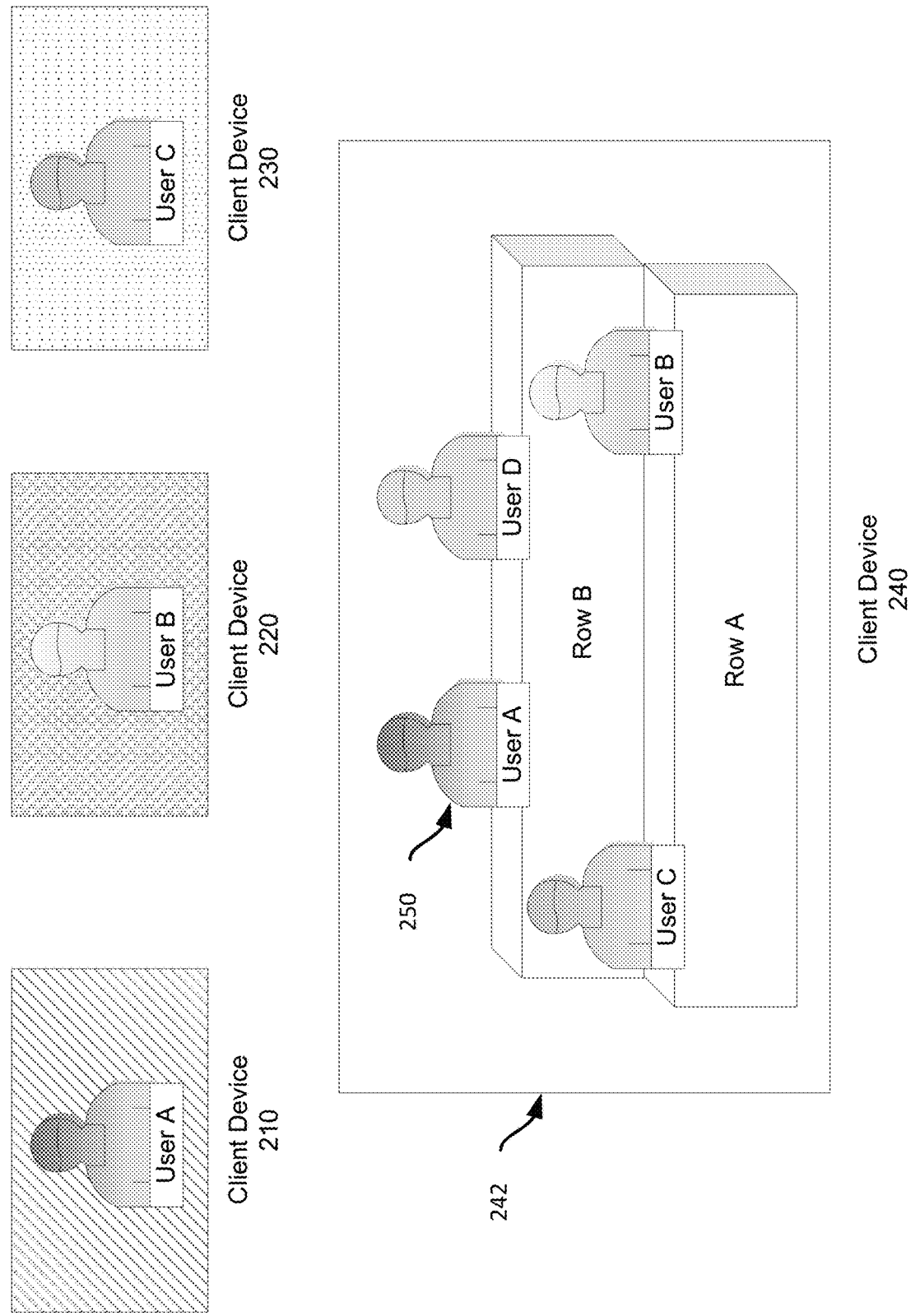

Referring now to FIG. 2, FIG. 2 illustrates another example system to enable immersive scenes. In the example shown, four users, Users A-D, are participating in a video conference utilizing client devices 210-240. Each of client devices 210-220 is displaying a video stream for the particular user A-C without an immersive scene. For those three users, the video stream includes the image of the user and a background. For example, on client device 210, User A is shown on a cross-hatched background. This illustration is a simplified version of the display and the various users may have various backgrounds depicted behind them, such as whatever background is captured by their respective cameras, or an image selected by the user to serve as the background (e.g., a beach scene). In addition, the client devices may display video feeds from other Users as well. For instance, each client device may also include images of the other participants in the video conference once the video conference begins.

When the host or another participant indicates that the video conference s to be displayed with an immersive scene, a dynamic immersive background 242 is distributed to each video conference participant via the video conference provider. In the example shown, the dynamic immersive background 242 for a classroom includes and image that resembles a conference room with theater seating with each row of "seating" further back in the classroom is also elevated. For example, Row A is immediately in front of and below Row B.

In addition to the background image, the participants also receive data indicating how the various video streams from the different users are to be displayed in the immersive scene. In the example shown, the video streams for individual users are placed in the rows in the classrooms and separated by a defined amount. The locations within the immersive scene may be predefined, e.g., at specific pixel locations within the image, or the data may identify features in the immersive scene to which video streams may be associated, such as the apparent desks in the example immersive scene 242 shown in FIG. 2, or chairs, etc. in other examples.

In order to display each of the video streams in the immersive scene, the background is removed from the respective video stream. For example, as shown in Figure, the video stream for User A is placed in Row B on the left side, but the hatched background displayed with User A on client device 210 is replaced by a removable background that allows the recipient's client device to display the immersive scene in place of the back ground, e.g., the background may be made transparent, allowing the immersive scene to be seen through it. Thus, when the immersive scene is displayed on client device 240 (and on the other client devices 210-230 (not shown)), the user appears to be sitting at the virtual desk in Row B. The stream 250 for the User A then continues to play normally. In other words, the immersive scene is dynamic. User A's video changes normally as the user moves or speaks within the video frames. Thus, the user continues to be able to speak and otherwise participate with and interact within the video conference and the other participants in the video conference; however, they appear to be seated at their respective desks in the scene.

Figure 3:
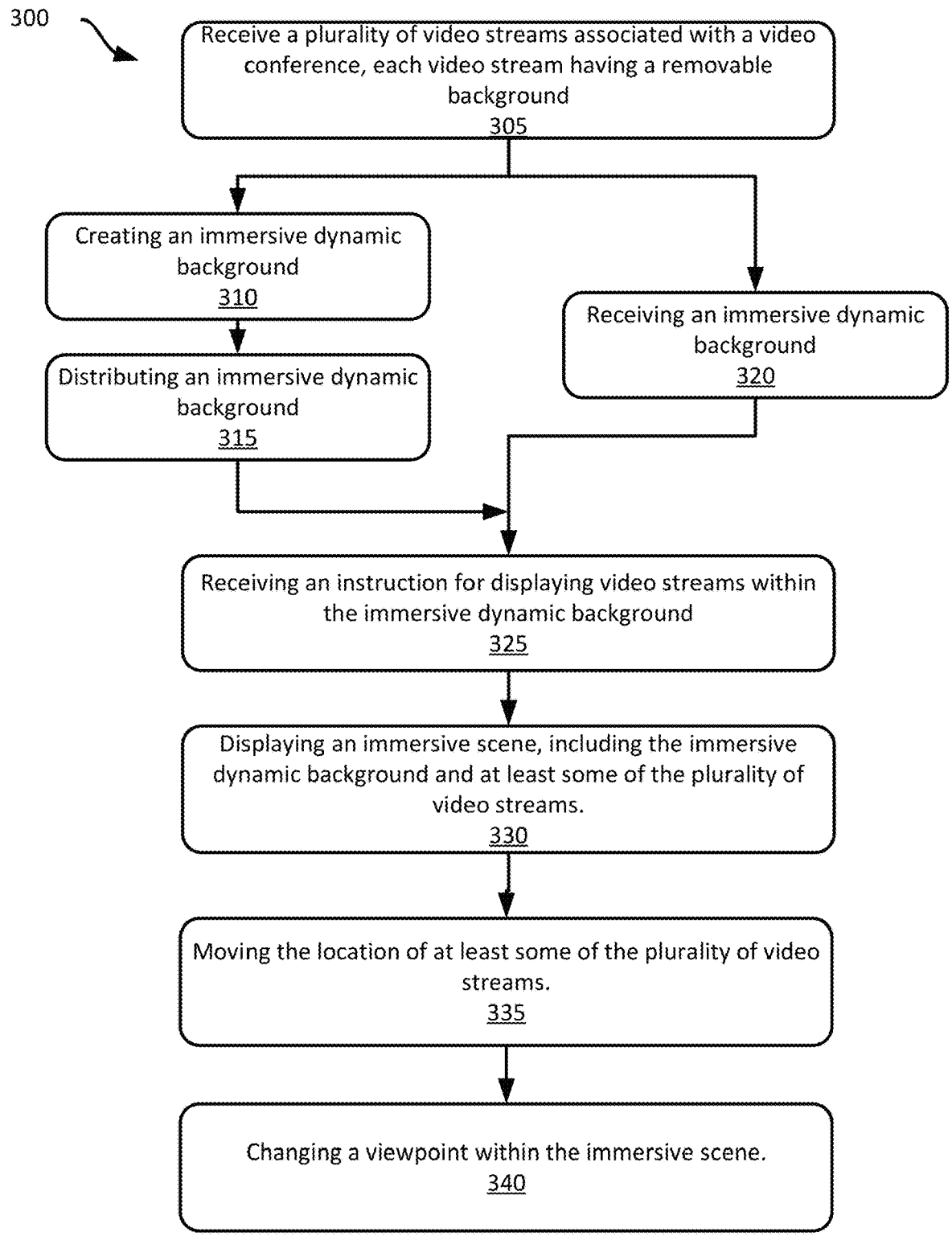
FIG. 3-5 illustrate example methods for providing immersive scenes.

Referring now to FIG. 3, FIG. 3 illustrates an example method 300 for providing immersive scenes. In the example method 300 shown, the method begins at step 305 when a client device 140 receives a plurality of video streams associated with a video conference. Each of the plurality of video streams is recorded by a corresponding client device and has had its background identified made removable. For example, the video conference software executing on the client device 140 may define an outline around the user within captured video frames. Then, using the outline, the client software can remove the background, i.e., anything in a frame of the video stream that is outside the area defined by the user outline. Removing the background can include flagging pixels as being outside of the outline as being removable, or it can include identifying pixels contained in the outline and specifying which portion of the video frame is within the outline. In some examples, removing the background may involve making the background transparent, such as by applying or modifying an alpha value for each pixel in the background to set the pixel to be transparent, e.g., a maximum or minimum alpha value.

At step 310, a host or other participant of the video conference creates a dynamic immersive background. For example, the user may select their own background as a dynamic immersive background. Selecting their own background causes the client software to create a dynamic immersive background based on the user's background. For example, the client software may create an image file, such as a JPG or TIFF file that contains the background. Alternatively, the user may select a previously created immersive scene that is available from the video conference provider or from another source.

In addition to creating the background image, the user may also define one or more locations within the background image at which user video streams may be displayed.

For example, the user may employ an editing tool to select regions within the background image and assign video feeds to those regions. The editing tool may use the selected regions to generate and store data that may be provided to other user's client devices as will be described below. Such data may be stored in a markup language or other suitable format.

At step 315, the client software distributes the dynamic immersive background. For example, the client software may transmit the dynamic immersive background to the video conference provider 110, which then forwards the dynamic immersive background to each participant of the video conference.

Alternatively, the client software executing on client 140 device may utilize an existing dynamic immersive background. For example, at step 320, the client software receives a dynamic immersive background. The dynamic immersive background may be stored on a user's computer or at a network location, such as on video conference provider 110. In one example, the video conference provider 110 stores a set of dynamic immersive backgrounds from which video conference providers can select for various video conferences. For example, a dynamic immersive background might represent a classroom as in FIG. 2 or a courtroom or digital office space.

At step 325, the client device 140 receives an instruction to display video streams within the dynamic immersive background. For instance, the instruction may include identification for a plurality of locations within the dynamic immersive background in which each video stream may be displayed. The instruction may be received in any number of forms. In some examples, the client device 140 receives the instruction as a data structure. In one such example system, the data structure is an eXtensible Markup File (XML). For instance, the following is sample XML for providing the instruction.

```
 1 <?xml version="1.0" encoding="UTF-8"?>
 2 <templates id="5E7559E2-0C08-4BCF-8553-
   0564306287A6" name="boardroom" version="1.0"
   parser_version="1.0">
 3 <title>
 4 <en value="board room"/>
 5 <zh_hans value="董事会会议室"/>
 6 <zh_hant value="董事會會議室"/>
 7 <de value="Zimmer mit Balkon"/>
 8 <es value="Sala de juntas"/>
 9 <fr value="Salle de réunion du Conseil
   d'administration"/>
10 <it value="sala da pranzo"/>
11 <ja value="ボードルーム"/>
12 <ko value="호`호`의`실"/>
13 <pt value="Quarto de Bordo"/>
14 <ru value="Зал, Заседаний Совета"/>
15 <vi value="Phòng điều hành"/>
16 </title>
17 <template id="4E3C6978-18EF-4493-BD13-
   070DF7B279B1" crop_mode="cut"
   layout_mode="free">
18 <style name="1" source="% auto %"
   bkcolor="#FF222222" scale="cut"/>
19 <container bkcolor="#FF1A1A1A">
20 <default_video_strip valign="top" video_
   port_style="1"/>
21 <canvas width="1920" height="1080"
   valign="center" kimage="./boardroom.jpg" >
22 <seat id="1" zorder="7" source_priority="7"
   pos="197,432,381,585" video_port_style="1"/>
23 <seat id="2" zorder="5" source_priority="5"
   pos="393,432,577,585" video_port_style="1"/>
24 <seat id="3" zorder="3" source_priority="3"
   pos="590,432,773,585" video_port_style="1"/>
25 <seat id="4" zorder="1" source_priority="1"
   pos="786,432,967,585" video_port_style="1"/>
26 <seat id="5" zorder="2" source_priority="2"
   pos="992,432,1169,585" video_port_style="1"/>
27 <seat id="6" zorder="4" source_priority="4"
   pos="1184,432,1359,585" video_port_style="1"/>
28 <seat id="7" zorder="6" source_priority="6"
   pos="1385,432,1564,585" video_port_style="1"/>
29 <seat id="8" zorder="8" source_priority="8"
   pos="1575,432,1754,585" video_port_style="1"/>
30 <float_panel id="1000" zorder="1000">
31 </float_panel>
32 </canvas>
33 </container>
34 </template>
35 </templates>
```

When the client device 140 receives the above XML file, the client device 140 parses the XML file in order to identify properties associated with each of the various locations within the immersive scene and with respect to the dynamic immersive background. In the example XML, each location is assigned a "seat id" and a position. For example, the position for seat ID 1 is "197,432,381,585." And each seat id is provided with a similar position so that when the video streams are received, the client device 140 is able to place the appropriate video stream in the correct virtual seat. The example XML also includes information identifying an order (the "zorder") in which to assign video feeds to the different locations. Thus, when video feeds from different client devices are received, the client's device can assignment them to a corresponding seat id, such as based on their names, order of arrival at class, etc. Such functionality may allow the teacher to determine who arrived in class when, and may allow the classroom to fill from the center front outwards.

At step 330, the client device 140 displays the immersive scene, including the immersive dynamic background and one or more of the plurality of video streams associated with the video conference. The immersive scene may be displayed to include all the video streams associated with a video conference or a subset. For example, a screen may only be large enough to display ten seats in a virtual classroom, and so the immersive scene may only include ten participants of a video conference even if the video conference includes many more participants. Each of the video streams is displayed at the location in the dynamic immersive background based on the instruction.

At step 335, the client device moves the video stream from one location in the immersive scene to another location in response to a user input. For example, a participant video stream may be moved from seat ID 1 to seat ID 2 in response to a user clicking on the video stream and dragging it across the screen from left to right. In some examples, moving the stream in this way may cause the instruction to be modified such that the participant video stream is assigned to seat ID 2 going forward.

At step 340, the client device 140 changes perspective with respect to the immersive scene. For example, the perspective of the user viewing the immersive scene may move closer to the video streams in the first row. Such a change in perspective might cause a video stream that is displayed at a first size to then be displayed at a second size. As the viewpoint moves closer, the display size of the video stream increases, i.e., becomes larger. In addition, it may also zoom in on the background image, thereby reducing the number of available video stream locations, reducing the number of other users visible in the dynamic scene. In other examples, the client device may change the viewer's perspective by panning across the dynamic immersive background or by zooming in or out the immersive scene. If the viewer zooms out, it may reduce the size of the various video streams, but it also may allow additional video streams to be viewed simultaneously on the background.

Thus, by distributing (or otherwise receiving an immersive dynamic background), users within the video conference may be provided with a richer more interactive view of the other participants in the video conference.

Figure 4:
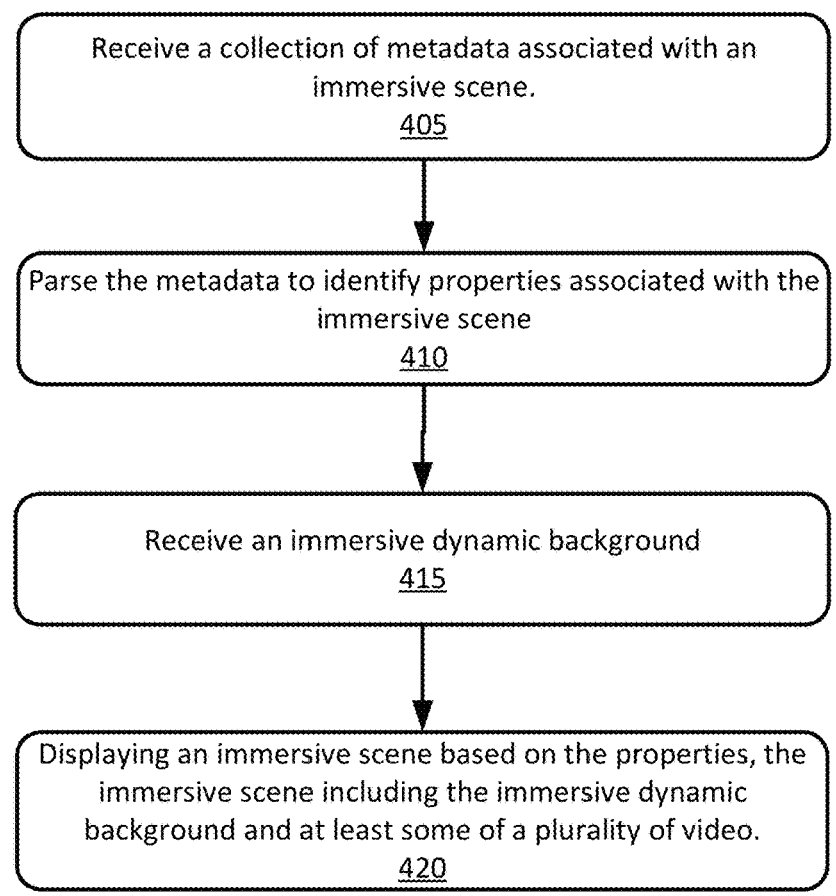

Referring now to FIG. 4, FIG. 4 illustrates another example method 400 for providing immersive scenes. The method 400 begins at step 405 when the client device 140 receives a collection of metadata associated with an immersive scene. For example, the client device may receive a text file that includes metadata for displaying video streams in an immersive scene.

At step 410, the client device parses the metadata to identify properties associated with the immersive scene. The properties may include, for example, the location of video streams as described above with respect to FIG. 3. At step 415, the client device 140 receives a dynamic immersive background, generally as described above with respect to block 320. And at step 420, the client device 140 displays an immersive scene based on the properties, the immersive scene including the immersive dynamic background and at least some of a plurality of video feeds.

Figure 5:
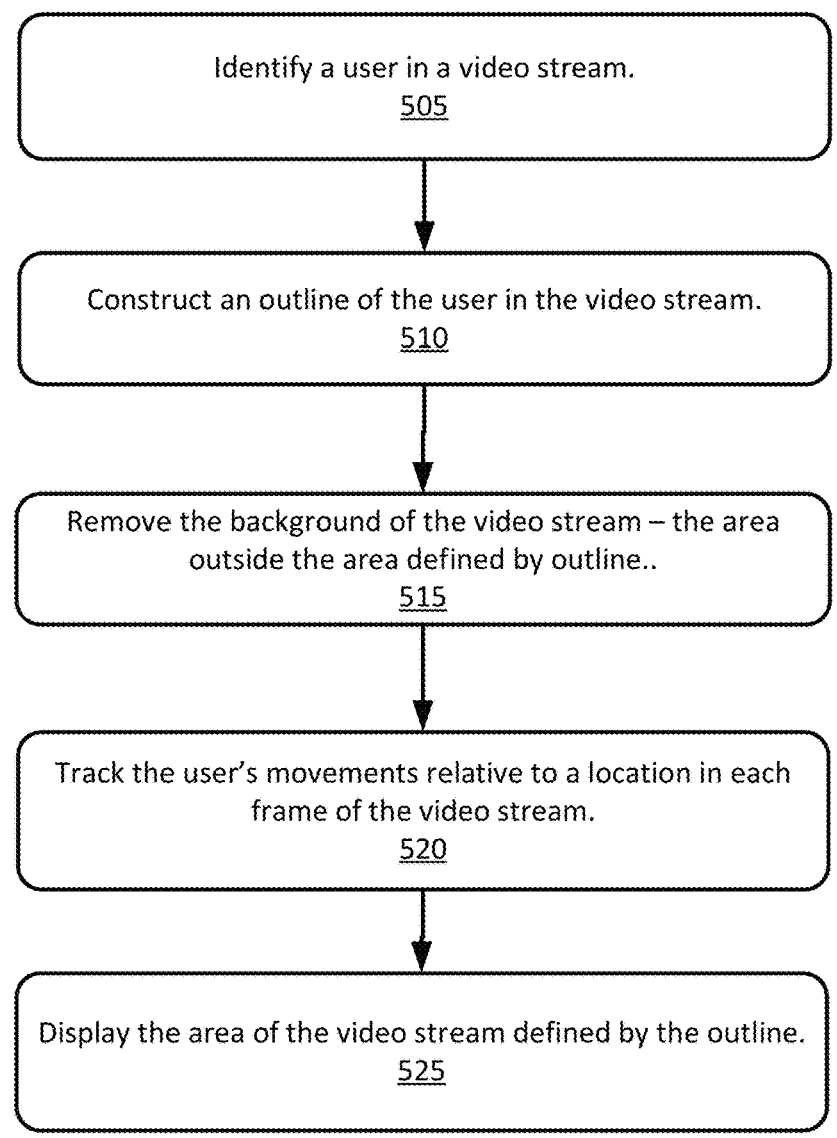
Figure 6:
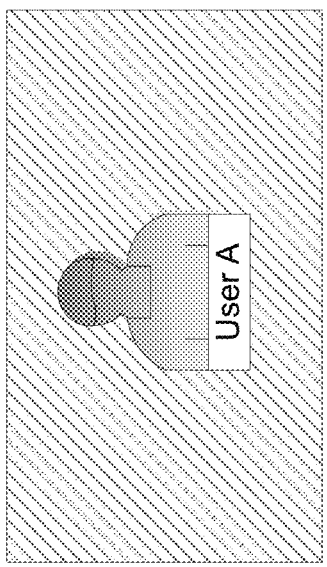
FIG. 6 illustrates an example system for providing immersive scenes that enable tracking of a user.
Figure 6:
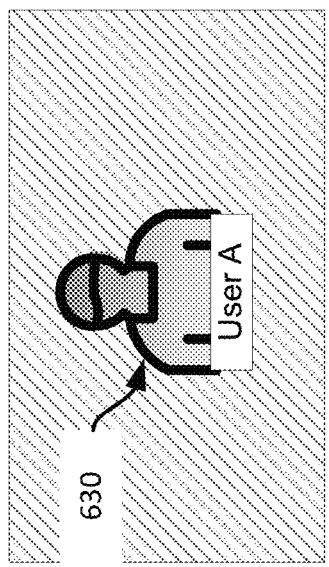
Figure 6:
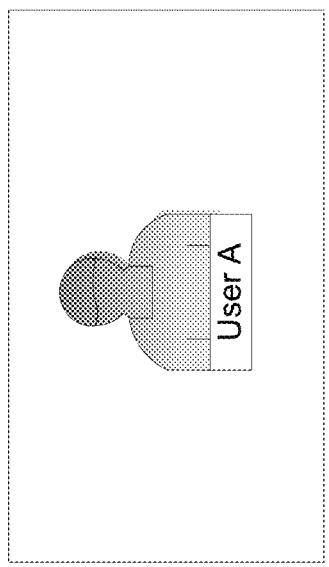

Referring now to FIGS. 5 and 6, FIG. 5 illustrates an example method 500 for providing immersive scenes that includes tracking a user within the immersive scene. FIG. 6 illustrates an example system for providing immersive scenes that enable tracking of a user. At step 505, the client device 140 identifies a user in a video stream. For example, in FIG. 6, in the original video stream 610, User A is present in the video stream and is displayed on a background.

At step 510, the client device constructs an outline of the user in the video stream. In this example, the client device receives captured video frames from a camera, such as an integrated camera or a webcam. The received video frames are then analyzed using any suitable face recognition technique to identify a person's face within the video frame. The client device may then identify features such as clothing or hair that is associated with the face to determine the outline of the person. In FIG. 6, the video stream with the outline defined is depicted in block 615. The outline is represented by a thicker line 630 displayed around the user. The area outside the outline 630 is the background. The area inside the outline 630 is User A.

At step 515, the client device removes the background of the video stream, i.e., the area outside the area defined by the outline. In one example system, removing the background means modifying the background, such as by adding, setting, or adjusting an alpha channel for each pixel in each video frame that is outside of the outline to have a maximum transparency value. In another example, the pixels outside of the outline may be set to a predetermined, specific "green screen" value, e.g., black, green, blue, etc., that will indicate to the receiver that the pixels are to be treated as removable. The original image with the background converted to be removable is depicted in FIG. 6.

At step 520, once the outline has been defined, the client device 140 is able to track the user's movements relative to a location in each frame of the video stream. For example, the client device can compare a first frame of a video stream to a second frame of a video stream and determine a delta, i.e., movement, between a point on the outline in the first frame and that same point in a second frame. The movement of the outline is associated with a movement of the user. Such tracking may occur using consecutive frames or frames that are not consecutive and may affect the location of the user within the image and thus the alignment of the user with the immersive dynamic background.

At step 525, the client device 140 displays the area of the video stream defined by and contained within the outline. Since the outline is created around the user, displaying the area inside the outline results in displaying the user after the movement. For example, if User A moves from the center of the screen in the original video stream 610 to a position at the far left of the screen, the client device 140 can track the user and only display the user in the immersive scene and, in addition, can maintain the appearance that the user is sitting in the same desk, despite having apparently moved within the video frame. In this way, only a portion of the video stream containing the user, and not the entire video stream, is displayed on the dynamic immersive background within the immersive scene, thereby allowing more space to display video streams than would otherwise be possible due to backgrounds being visible or otherwise occupying space within the immersive scene.

Figure 7:
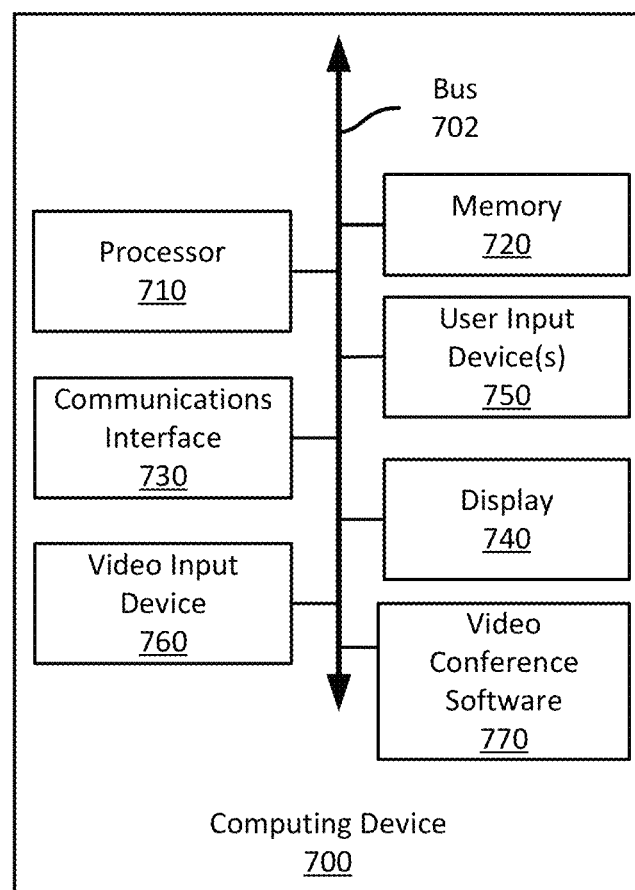
FIG. 7 shows an example computing device suitable for use with any disclosed systems or methods according to this disclosure.

Referring now to FIG. 7, FIG. 7 shows an example computing device 700 suitable for use in example systems or methods for sharing content across video conferencing sub-meetings. The example computing device 700 includes a processor 710 which is in communication with the memory 720 and other components of the computing device 700 using one or more communications buses 702. The processor 710 is configured to execute processor-executable instructions stored in the memory 720 to perform one or more methods for providing immersive scenes according to different examples, such as part or all of the example methods 300, 400, and 500 described above with respect to FIGS. 3, 4, and 5. The computing device, in this example, also includes one or more user input devices 750, such as a keyboard, mouse, touchscreen, video input device (e.g., one or more cameras), microphone, etc., to accept user input. The computing device 700 also includes a display 740 to provide visual output to a user as well as a video input device 760, such as a camera, to capture visual input.

In addition, the computing device 700 includes video conference software 770 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving, at a client device, a collection of metadata associated with an immersive scene;
   identifying, at the client device, each of a plurality of properties of the immersive scene based on the collection of metadata;
   receiving, at the client device, a dynamic immersive background;
   receiving, at the client device, a plurality of video streams associated with a video conference; and
   displaying, at the client device, each of the plurality of video streams in the immersive scene based at least in part of the plurality of properties of the immersive scene and on the dynamic immersive background.

2. The method of claim 1, wherein the collection of metadata comprises a data structure.

3. The method of claim 2, wherein the data structure comprises an XML file.

4. The method of claim 1, wherein the dynamic immersive background is received from a participant of the video conference.

5. The method of claim 1, further comprising creating the dynamic immersive background.

6. A system comprising:
   a processor; and
   at least one memory device including instructions that are executable by the processor to cause the processor to:
   receive, at a client device, a collection of metadata associated with an immersive scene;
   identify, at the client device, each of a plurality of properties of the immersive scene based on the collection of metadata;
   receive, at the client device, a dynamic immersive background;
   receive, at the client device, a plurality of video streams associated with a video conference; and
   display, at the client device, each of the plurality of video streams in the immersive scene based at least in part of the plurality of properties of the immersive scene and on the dynamic immersive background.

7. The system of claim 6, wherein the collection of metadata comprises a data structure.

8. The system of claim 7, wherein the data structure comprises an XML file.

9. The system of claim 6, wherein the dynamic immersive background is received from a participant of the video conference.

10. The system of claim 6, further comprising creating the dynamic immersive background.

11. A non-transitory computer-readable medium comprising code that is executable by a processor for causing the processor to:
    receive, at the client device, a collection of metadata associated with an immersive scene;
    identify, at the client device, each of a plurality of properties of the immersive scene based on the collection of metadata;
    receive, at the client device, a dynamic immersive background;
    receive, at the client device, a plurality of video streams associated with a video conference; and
    display, at the client device, each of the plurality of video streams in the immersive scene based at least in part of the plurality of properties of the immersive scene and on the dynamic immersive background.

12. The non-transitory computer-readable medium of claim 11, wherein the collection of metadata comprises a data structure.

13. The non-transitory computer-readable medium of claim 12, wherein the data structure comprises an XML file.

14. The non-transitory computer-readable medium of claim 11, wherein the dynamic immersive background is received from a participant of the video conference.

15. The non-transitory computer-readable medium of claim 11, further comprising creating the dynamic immersive background.

16. A method comprising:
receiving, at a client device, a plurality of video streams associated with a video conference;
identifying, in each of the plurality of video streams, a user;
constructing, for each of the plurality of video streams, an outline of the user, the outline defining an area of each of the plurality of video streams inside the outline;
displaying the video conference, including the area inside the outline of each of the plurality of video streams;
identifying a movement of at least one of the users within the plurality of video streams; and
redisplaying the area of the video streams defined by the outline associated with the movement.

17. The method of claim 16, wherein the video stream comprises a background in the area outside the outline and further comprising removing the background of the video stream.

18. A system comprising:
a processor; and
at least one memory device including instructions that are executable by the processor to cause the processor to:
receive, at a client device, a plurality of video streams associated with a video conference;
identify, in each of the plurality of video streams, a user;
construct, for each of the plurality of video streams, an outline of the user, the outline defining an area of each of the plurality of video streams inside the outline;
display the video conference, including the area inside the outline of each of the plurality of video streams;
identify a movement of at least one of the users within the plurality of video streams; and
redisplay the area of the video streams defined by the outline associated with the movement.

19. The system of claim 18, wherein the video stream comprises a background in the area outside the outline and further comprising instructions that are executable by the processor to cause the processor to remove the background of the video stream.

20. A non-transitory computer-readable medium comprising code that is executable by a processor for causing the processor to:
receive, at a client device, a plurality of video streams associated with a video conference;
identify, in each of the plurality of video streams, a user;
construct, for each of the plurality of video streams, an outline of the user, the outline defining an area of each of the plurality of video streams inside the outline;
display the video conference, including the area inside the outline of each of the plurality of video streams;
identify a movement of at least one of the users within the plurality of video streams; and
redisplay the area of the video streams defined by the outline associated with the movement.

21. The non-transitory computer-readable medium of claim 20, wherein the video stream comprises a background in the area outside the outline and further comprising code that is executable by a processor for causing the processor to remove the background of the video stream.

* * * * *